United States Patent Office 3,476,290
Patented Nov. 4, 1969

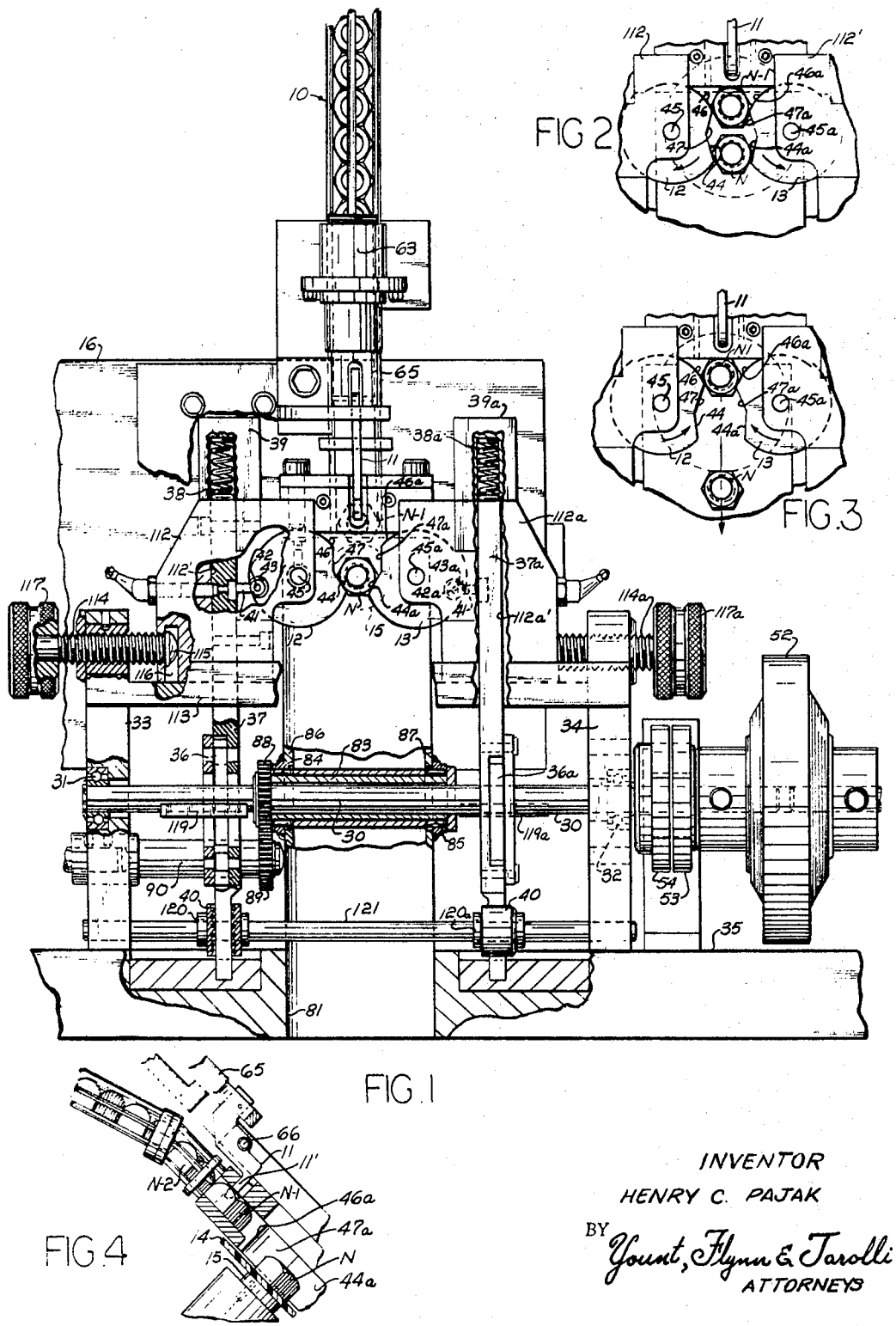

3,476,290
ESCAPEMENT MECHANISM
Henry C. Pajak, Parma, Ohio, assignor to The Lamson & Sessions Co., Cleveland, Ohio, a corporation of Ohio
Filed Jan. 19, 1968, Ser. No. 699,218
Int. Cl. B65g *47/88, 59/06*
U.S. Cl. 221—297      2 Claims

ABSTRACT OF THE DISCLOSURE

This escapement mechanism has a pair of oppositely rotatable gate members defining a gap between them along the path of the articles to be detained. In a first rotational position the gate members pass the article into the gap between them and they engage the article at the outlet side of the gap. When turned simultaneously in opposite rotational directions to a second position, the gate members release the previously-detained article and they prevent the next article from entering the gap between them until they are returned to the first rotational position.

---

This invention relates to an escapement mechanism for briefly detaining individual articles which move along a predetermined path.

In the manufacture of various articles, such as nuts or other small workpieces, it is sometimes necessary or desirable to detain the articles individually in succession, such as while each article is being inspected for flaws. The present invention is directed to a novel and improved escapement mechanism constructed and arranged to positively detain each successive article in a stable position for a brief interval of time and then to release the article at the end of this interval, such as the interval required to inspect the article for flaws.

Accordingly, it is an object of this invention to provide a novel and improved escapement mechanism for individually detaining successive articles in a series.

Another object of this invention is to provide such an escapement mechanism which is constructed and arranged to release the detained article before accepting the next article in the series, so that the successive articles are kept out of contact with each other while entering and leaving the escapement mechanism.

Another object of this invention is to provide such an escapement mechanism having a pair of oppositely rotatable gate members which define a gap between them along the path o fthe articles and which have first and second sets of peripheral surfaces at the inlet and outlet sides of the gap, respectively, which are oppositely movable together and apart to alternately engage and release the incoming articles, such that a preceding article is released before the next article enters the gap between the gate members.

Further objects and advantages of this invention will be apparent from the following detailed description of the embodiment illustrated in the accompanying drawing.

In the drawing:

FIGURE 1 is a front elevational view, with certain parts broken away for clarity, showing a nut inspection apparatus provided with an escapement mechanism in accordance with the present invention;

FIGURE 2 is a fragmentary elevational view showing the escapement mechanism as it is releasing a nut which has just been inspected;

FIGURE 3 is a similar view of this escapement mechanism after the nut has been released and just before the next nut will move into position to be inspected; and FIGURE 4 is a side elevational view of a nut holdback mechanism which operates in timed relationship with the present escapement mechanism in the FIG. 1 apparatus.

Referring to FIG. 1, for purposes of illustrating one particular use of the present escapement mechanism, a nut inspection apparatus is shown, having an inclined chute or guideway 10 down which the nuts to be inspected slide by gravity, with each nut resting on the upper side edge of the nut immediately ahead of it. At the lower end of this chute a pivoted finger 11 (FIG. 4) projects into the central opening in the lowermost nut in the stack to hold the latter against movement downward by gravity until the finger 11 is momentarily displaced counterclockwise in FIG. 4, as described hereinafter.

Spaced below the nut holdback finger 11 is an escapement mechanism in accordance with the present invention. In the particular embodiment shown, this escapement mechanism comprises a pair of pivoted, confronting, nut-positioning gate members or jaws 12 and 13 (FIG. 1) which are located on opposite sides of the path of downward travel of the nuts and are normally positioned to engage the lower end of the nut N being inspected.

In this nut inspection apparatus, the nut N whose lower end is engaged by the gate members 12, 13 directly overlies a thin, flat, dielectric window 14 which is inclined at about 45° to the vertical, as shown in FIG. 4. Immediately beneath this plate is located the rotary scanning head or probe 15 of an eddy current-type flaw detection machine of known design.

The purpose of the present escapement mechanism in this nut inspection apparatus is to hold the nut overlying the dielectric window for a brief period of time while the nut is being scanned by the probe 15, then to release this nut to slide off the window by gravity, and then to receive and detain the next nut which drops down from the supply chute 10.

Referring to FIG. 1 in the present escapement mechanism, the nut-positioning gate member 12 has a generally circular, first peripheral surface 46 for part of its peripheral extent which is concentric with its pivot axis 45. At the laterally outward side of this axis this gate member 12 has a circular recess 43 in its periphery. At its laterally inward side the gate member 12 has a generally V-shaped, shallow recess defined by intersecting flat surfaces 44 and 47. The flat surface 44 is a second peripheral surface and the flat surface 47 is an additional peripheral surface on the gate member 12. The first peripheral surface 46 is disposed above the rotational axis of gate member 12 and the second peripheral surface 44 is disposed below this axis in all operating positions of the gate member.

The second nut-positioning gate member in the present escapement mechanism is a mirror image of the first gate member 12, and its respective peripheral surfaces are given the same reference numerals with an "a" suffix added.

The two gate members 12 and 13 define a gap between them which is located along the path of the nuts as they drop down by gravity. The first peripheral surfaces 46 and 46a on the gate members are at the inlet side of this gap, and the second peripheral surfaces 44 and 44a are at the outlet side of this gap.

The angular or rotational positions of the gate members 12 and 13 are under the control of a motor-driven drive shaft 30 (FIG. 1). This drive shaft is rotatably supported by ball bearings 31 and 32 which are carried by standards 33 and 34 extending up from the base 35 of the machine.

Toward its left end in FIG. 1, the drive shaft 30 carries a cam 36 which is received in a recess in an upwardly-extending, vertically reciprocable cam follower 37. This cam follower is snugly, but slidably, received in a vertical opening 112' in a support block 112, which is mounted on the frame of the machine as described hereinafter. A coil spring 38 is engaged under compression between the upper end of the cam follower 37 and an end piece 39 of the top of the support block 112. This spring biases the cam follower downward. The lower end of the cam follower is slidably received in a vertically disposed guide sleeve 40. A short distance below its upper end the cam follower 37 carries a laterally inwardly extending stub 41 having a roller 42 on its inner end which is snugly received in the circular recess 43 in the periphery of the first gate member 12.

With this arrangement, the bias spring 38 normally positions the cam follower 37 downward to the position shown in FIG. 1. In its lowermost position, the cam follower 37 maintains the pivoted gate member 12 in a first rotational position, as shown in FIG. 1, in which its flat second peripheral surface 44 is inclined upward and laterally outward for engagement beneath the downwardly-inclined flat surface on the one side of the hexagonal nut N. Once during each rotation of the drive shaft 30 the cam 36 forces the cam follower 37 upward and, through ist connection to the gate member 12, the cam follower turns the latter clockwise in FIG. 1 about its pivot 45 to a second rotational position in which its nut-supporting second peripheral surface 44 is positioned laterally outward away from the nut N and its circular first peripheral surface 46 is in the path of downward movement of the next nut above.

The rotational position of the second gate member 13 is similarly controlled by an identical cam-operated arrangement whose parts are designated by the same reference numerals (with an "a" subscript added) as the just-described elements for controlling gate member 12. The two gate members 12 and 13 are moved in unison with each other in opposite rotational directions.

Referring to FIGS. 1–3, which show the sequence of operation of the gate members 12 and 13, it will be seen that the flat additional peripheral surface 47 on the gate member 12 extends substantially vertically upward from the inner end of the nut-supporting, flat, second peripheral surface 44 on this gate member when it is in its extreme counterclockwise position (FIG. 1) for supporting the nut N being scanned. The corresponding flat additional peripheral surface 47a on the second gate member 13 also extends vertically upward when it is in its extreme clockwise position, as shown in FIG. 1. In this first position of the gate members 12 and 13, the inner ends of the curved first peripheral surfaces 46 and 46a and the flat surfaces 47 and 47a on the gate members 12 and 13 are spaced apart substantially farther than the corner-to-corner dimension of the nut, so that the nut can drop down between them to rest on the nut-supporting, flat, second peripheral surfaces 44 and 44a on the gate members, which incline upward and laterally outward on opposite sides of the nut N. Surfaces 44 and 44a are closer together than the width of the nut, so that they hold the nut in this position.

When the cam followers 37 and 37a are moved upward simultaneously, which occurs once during each rotation of the drive shaft 30, the gate member 12 is turned clockwise and at the same time the gate member 13 is turned counterclockwise from their FIG. 1 positions. During such movements of the gate members, as shown in FIG. 2, their respective nut-engaging second peripheral surfaces 44 and 44a move laterally outward and downward away from engagement with the nut N which had been in position to be scanned, overlying the dielectric window 14, and their first peripheral surfaces 46 and 46a move toward each other and beneath the next nut N–1, which is dropping down by gravity upon being released by the retaining finger 11. As shown in FIG. 2, this next nut N–1 does not strike the top of the nut N which has just been scanned.

Such movement of the gate members 12 and 13 clockwise and counterclockwise, respectively, in response to the upward movement of the cam followers 37 and 37a, continues until the nut N which has just been scanned drops clear of the gate members. At the same time, the first peripheral surfaces 46 and 46a on the gate members hold the next nut N–1 from dropping down.

After the cam followers 37 and 37a reach the top of their respective strokes, they begin to move downward, under the urging of their springs 38, 38a and gravity, causing the gate member 12 to turn counterclockwise and the gate member 13 to turn clockwise, as shown in FIG. 3. These return movements of the gate members continue until their first peripheral surfaces 46 and 46a move clear of the next nut N–1 and their second surfaces 44 and 44a move into the path of this nut as it drops down. Finally, in the lowermost positions of the cam followers 37 and 37a, the gate members 12 and 13 will have returned to the positions shown in FIG. 1, in which their second peripheral surfaces 44 and 44a engage and support this nut in position to be scanned by the rotating probe or scanning head 15.

The lateral spacing between the gate members 12 and 13 may be adjusted to accommodate different sizes of nuts to be inspected. As shown in FIG. 1 the pivot pin 45 for the first gate member 12 is carried by the aforementioned support block 112, whose lower end rests slidably on a horizontal guide rail 113 which extends laterally of the machine. An adjusting screw 114 is threadedly received in a secrew-threaded opening in the standard 33 of the machine frame and it has an enlarged rounded inner end 115 which is held captive in a recess 116 in the support block 112. A knurled knob 117 is attached to the outer end of the adjusting screw.

The cam 36 which operates gate member 12 is keyed to the drive shaft 30 at 119 so that it can slide along the drive shaft.

The vertically disposed guide sleeve 40 which receives the lower end of the cam follower 37 is attached to a tubular support 120 which is freely slidable along a horizontal shaft 121 extending parallel to the drive shaft 30, laterally of the machine.

With this arrangement, the adjusting screw 114 may be turned to move the support block 112 laterally inward or outward to the position desired for the particular size of nut to be inspected. The cam follower 37, cam 36 and guide sleeve 40 move laterlaly in unison with the support block 112, as does the gate member 112 which it supports pivotally. When the support block 112 is in the desired position along the guide rail 113, it is releasably clamped in place by a manually-operated clamping arrangement (not shown).

A similar arrangement is provided for enabling independent lateral adjustment of the other gate member 13. Corresponding elements of this arrangement have the same reference numerals, with an "a" suffix added, and the description of these elements will not be repeated.

From the foregoing description and the accompanying drawing it will be evident that the illustrated embodiment of the present invention is constructed and arranged to intercept an incoming article at the inlet side of the gap between the gate members while the preceding article is being released from its engagement by the gate members, so that the successive articles passing through the gate members do not strike one another. This is particularly advantageous where the escapement mechanism is used on a flaw detection apparatus in which the article to be inspected must assume a stable position before being inspected. The present escapement mechanism, by keeping the successive articles out of contact with each other, enables the detained article to assume a stable position in a very short time after it passes into the gap between the gate members, so that the successive articles can be inspected at a rapid rate.

Having described my invention, I claim:

1. An escapement mechanism for individually detaining hexagonal articles which are movable downward by gravity, said mechanism comprising a pair of oppositely rotatable gate members spaced apart laterally on opposite sides of said path and defining a gap between them through which the articles pass along said path, said gate members having a first set of peripheral surfaces located above the respective axes of rotation of the gate members at the inlet side of said gap which in one rotational position of the gate members are farther apart than the width of the article so as to pass the article into said gap, said gate members having at the outlet side of said gap a second set of confronting peripheral flat surfaces located below the respective axes of rotation of the gate members and which in said one rotational position of the gate members are closer together than the width of the article and are oppositely inclined upward and laterally outward for engagement respectively by oppositely inclined sides on the bottom of the hexagonal article throughout the major extent of said sides, said gate members having additional confronting peripheral surfaces at said gap which extend between the respective peripheral surfaces of said first and second sets, said additional peripheral surfaces in said one position of the gate members being farther apart than the width of the article so as to pass the article into engagement with said second set of peripheral flat surfaces, said first set of peripheral surfaces in a second rotational position of the gate members being closer together than the width of the article to prevent the next article from passing into the gap between the gate members, said second set of peripheral flat surfaces in said second rotational position of the gate members being farther apart than the width of the article so as to release the article previously detained by them, and means for turning said gate members simultaneously back and forth between said first and second positions thereof.

2. An escapement mechanism according to claim 1, wherein said means for turning the gate members comprises a pair of reciprocable members located respectively laterally beyond the outer sides of said gate members away from said gap between them, and means coupling each gate member rotatably to the respective reciprocable member off-center from the rotational axis of the gate member, said last-mentioned means comprising a stub projecting laterally inward from the respective reciprocable member and carrying a roller on its inner end, and each of said gate members having a respective circular recess receiving the respective roller laterally outward from the axis of rotation of the respective gate member.

References Cited

UNITED STATES PATENTS

| 1,686,978 | 10/1928 | Lorentzen | 221—297 |
| 2,358,421 | 9/1944 | Smith | 221—297 |
| 2,618,394 | 11/1952 | Miller | 221—223 |
| 2,946,481 | 7/1960 | Carew | 221—222 |

FOREIGN PATENTS

| 16,178 | 1/1912 | Great Britain. |

ROBERT B. REEVES, Primary Examiner